US00RE49134E

(19) United States
(12) Reissued Patent
He et al.

(10) Patent Number: US RE49,134 E
(45) Date of Reissued Patent: Jul. 12, 2022

(54) ERASURE CODING AND REDUNDANT REPLICATION

(71) Applicant: Amazon Technologies, Inc., Reno, NV (US)

(72) Inventors: Gang He, Beijing (CN); James Christopher Sorenson, III, Seattle, WA (US)

(73) Assignee: AMAZON TECHNOLOGIES, INC., Seattle, WA (US)

(21) Appl. No.: 14/816,481

(22) Filed: Aug. 3, 2015

Related U.S. Patent Documents

Reissue of:

(64) Patent No.: 8,504,535
Issued: Aug. 6, 2013
Appl. No.: 12/972,634
Filed: Dec. 20, 2010

(51) Int. Cl.
*G06F 16/957* (2019.01)

(52) U.S. Cl.
CPC ..... *G06F 16/9574* (2019.01)

(58) Field of Classification Search
CPC ..... G06F 17/30902
See application file for complete search history.

(56) References Cited

U.S. PATENT DOCUMENTS 6,442,601 B1 * 8/2002 Gampper ..... H04L 29/06 709/218
7,590,632 B1 * 9/2009 Caronni et al.
7,899,985 B2 * 3/2011 Saika ..... G06F 16/1824 711/111
8,458,287 B2 * 6/2013 Ozzie ..... G06F 11/1004 707/637
8,473,778 B2 * 6/2013 Simitci ..... H03M 13/373 714/6.2
9,047,310 B2 * 6/2015 Li ..... G06F 17/30206
2002/0138559 A1 * 9/2002 Ulrich ..... G06F 16/10 709/203
2003/0126247 A1 * 7/2003 Strasser ..... G06F 11/1458 709/223
2007/0156842 A1 * 7/2007 Vermeulen et al. ..... 709/217

* cited by examiner

*Primary Examiner* — Luke S Wassum
(74) *Attorney, Agent, or Firm* — Thomas | Horstemeyer, LLP

(57) ABSTRACT

Disclosed are various embodiments for employing an erasure coding storage scheme and a redundant replication storage scheme in a data storage system. Data objects that are greater than a size threshold and accessed less frequently than an access threshold are stored in an erasure coding scheme, while data objects that are sized less than a size threshold or accessed more often than an access threshold are stored in a redundant replication storage scheme.

102 Claims, 8 Drawing Sheets

ERASURE CODING AND REDUNDANT REPLICATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Various methods are employed to increase data durability of data in a relational database management system, a non-relational data storage system, or other distributed data storage system or distributed database. In large scale distributed data storage systems, redundant replication, where multiple copies of a data object are stored in multiple nodes of a distributed data storage system, which can also be disparately located across multiple data centers, can be employed to increase data durability. The storage costs of employing a redundant replication scheme as the amount and number of data objects in the distributed data storage system grows can be quite high.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure provide a data storage system in which data objects can be stored according to various storage schemes that increase data durability. As can be appreciated, a redundant replication storage scheme involves the storage of multiple copies of a data object across various nodes to improve reliability of the data storage system. In such a scenario, in the event of the failure of one of the nodes in a data storage system, a copy of the data object can be retrieved from another node. In a data storage system housing large amounts of data, exclusive use of such a storage scheme can result in high physical storage costs, as the capacity of nodes must be such that each can house the entirety of the data objects in the data storage scheme.

An erasure coding storage scheme can reduce storage costs, as such a scheme involves splitting data objects into multiple shards or fragments that are each sized less than the size of a data object encoded in the erasure coding scheme, and storing a subset of the shards in each of the nodes of the data storage system. In some embodiments, a total size of the multiple shards or fragments is greater than or equal to the size of a data object that is encoded in an erasure coding scheme. As one example, each node can store one of the shards. Accordingly, as can be appreciated in an erasure coding scheme, the data object then can be reconstructed from less than all of these shards. However, in order to retrieve the data object from the data storage system, the CPU and I/O operations needed to reconstruct a data object in this fashion can be higher relative to retrieval of a data object stored in a redundant replication storage scheme. Therefore, embodiments of the disclosure can store various data objects in varying storage schemes according to various factors that balance storage costs as well as computational costs of retrieval of the data objects.

Figure 1:
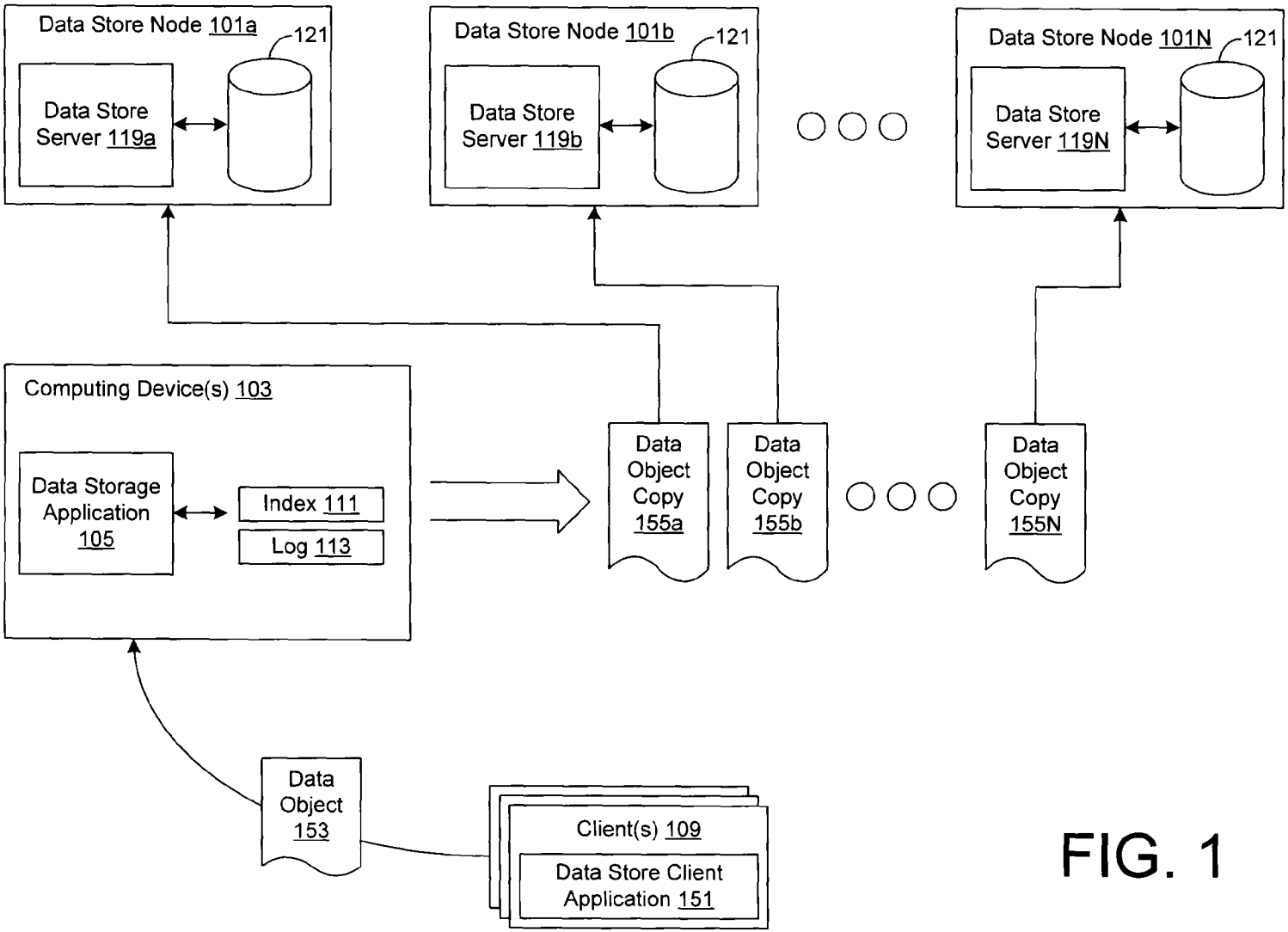
FIGS. 1-4 are drawings of a data storage system according to various embodiments of the present disclosure.

With reference to FIG. 1, shown is a data storage system comprising a plurality of data store nodes 101 and at least one computing device 103 according to an embodiment of the present disclosure. In one example of a data storage system according to an embodiment of the disclosure, there can be any number (N) of data store nodes 101 that house data objects that are accessible via a computing device executing a data storage application 105. It is understood that data store nodes 101 in a data storage system may be disparately located across various data centers and/or networks to increase reliability, disaster recovery capability, latency, and/or other considerations as can be appreciated. In one embodiment, the data store nodes 101 are in data communication with one or more computing devices 103 as well as each other over an appropriate network. The computing device 103 can in turn be in communication with one or more clients 109 over the network. Such a network may comprise, for example, the Internet, intranets, wide area networks (WANs), local area networks (LANs), wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above. Additionally, the data store nodes 101 can also be implemented in a computing device as described above.

Various applications and/or other functionality may be executed in the computing device 103 according to various embodiments. The components executed on the computing device 103, for example, include a data storage application 105, and other applications, services, processes, systems, engines, or functionality not discussed in detail herein. The data storage application 105 is executed to manage access and storage to data objects stored in a data storage system that also includes the various data store nodes 101. The data storage application 105 can receive requests from clients 109 to store, modify, and/or retrieve data objects from the data storage systems. As will be described in further detail herein, these data objects can be stored across the various data store nodes 101 in various encoding schemes.

The computing device 103 can maintain a data object index 111 that can maintain information about regarding data objects stored in the data storage system across the various data store nodes 101. The index 111 can include, for example, a location in the data store nodes 101 of data objects, a size, an encoding scheme of the data object as it is stored in the data storage system, and other information. In some embodiments, the index 111 can also include other information regarding data objects depending upon the implementation of a data storage system. For example, the index 111 can include a timestamp that reveals when a data object was created, accessed, modified, etc. In other words, the index 111 can include any information about data objects and/or fragments or shards of a data object stored in the data storage system that facilitate storage and retrieval of data objects in the data storage system.

The computing device 103 can also maintain a log 113 that can record a history of activity regarding data objects stored in the data storage system. In some embodiments, the log 113 can an access log that records a history of accesses of the data objects. In other words, the data storage application 105 can record each time a data object is accessed by a client 109 in the log 113. The data storage application 105 can record other information in the log 113 as can be appreciated, such as information about when an object is created, modified, or other historical data about data objects as can be appreciated.

Depending upon an implementation of a data storage system according to an embodiment of this disclosure, information about data objects in the data storage system can be stored in either the index 111, the log 113, or both. As one example, the data storage application 105 can store a most recent access of a data object in the index 111 in an entry associated with the data object, while the log 113 can store a record of each time a data object is accessed. Additionally, in one embodiment, the computing device 103 can maintain the index 111 in memory so that the index 111 can be quickly retrieved and/or manipulated and data objects can be quickly retrieved from the various data store nodes 101. In other words, the index 111 can be maintained in memory to improve performance of the data storage system. Alternatively, the log 113 can be stored and/or maintained in a data store, solid state storage system, hard disk drive, or other storage system, as the data storage application 105 may not need to quickly access the log 113 for performance reasons, and the amount of data stored in the log 113 may render maintaining the log 113 in memory prohibitively impractical.

However, other variations of an implementation of the computing device 103 as it pertains to the arrangement of data in an index 111 and/or log 113 should be appreciated by a person of ordinary skill in the art. As one example, in one embodiment of a data storage system the index 111 may only maintain a storage location among the data store nodes 101 of a data object, while other data regarding the object, such as an encoding scheme and timestamp, can be stored in the log 113. In other embodiments, a data storage system may store all relevant information about data objects in a log 113 and forego the use of an index 111 altogether. Other variations should be appreciated, and the implementation discussed above is but one example given for illustrative purposes only.

The components executed on the data store nodes 101, for example, include a data store server 119, and other applications, services, processes, systems, engines, or functionality not discussed in detail herein. The data store server 119 can be in communication with the data storage application 105 and facilitate storage and/or retrieval of data to data objects stored in a data store node 101. The data store server 119 can receive requests from the data storage application 105 to store, modify, and/or retrieve data objects in a data store node 101 that is a part of a data storage system. A data store node 101 can also include a data store 121 in which data objects can be stored. As will be discussed herein, in some embodiments, a copy of a data object can be stored in the data store 121 as can fragments or shards of a data object.

The client 109 is representative of a plurality of client devices that may be in communication with the computing device 103 over a network. The client 109 may comprise, for example, a processor-based system such as a computer system. Such a computer system may be embodied in the form of a desktop computer, a laptop computer, a server computer, a cloud computing resource, a grid computing resource, or other devices or systems with like capability. The client 109 may be configured to execute various applications such as a data store client application 151 and/or other applications. The data store client application 151 may be executed in a client 109 to facilitate interaction with the data storage application 105. In one embodiment, the data store client application 151 may be configured, for example, to access and render network pages, such as web pages, or other network content served up by the computing device 103, and/or other servers for the purpose of interfacing with the data storage application 105.

In various embodiments, the data store client application 151 may comprise a thin client application, a thick client application, or another type of client application. Some embodiments may include a graphical user interface and/or a command-line interface. In some embodiments, the client 109 can be configured to interact with a data storage system provided by the computing devices 103 as well as the data store nodes 101a . . . 106N via an application programming interface (API) provided by the data storage application 105 executed in a computing device 103.

Although the data store client application 151 is described as executed in a client 109, it is understood that the client 109 may correspond to a server computer that processes business logic, generates network pages, and/or performs other tasks. Thus, although requests to store, modify, and/or retrieve a data object in the data storage system can be initiated by a user through a user interface provided by a data store client application 151 and/or the data storage application 105, such a request may also be generated automatically by business logic applications, workflow engines, content servers, application servers, and/or other applications.

The data store client application 151 may correspond to a portion of another application, such as, for example, a module, a library, etc. in various embodiments. A request to access the data storage system may be sent over a network to the data storage application 105 using hypertext transfer protocol (HTTP), simple object access protocol (SOAP), remote procedure call (RPC), remote method invocation (RMI), a proprietary protocol and/or other protocols.

Next, a general description of the operation of the various components of a data storage system according to an embodiment of the disclosure is provided. FIG. 1 illustrates an example of a data object 153 being stored in a data storage system facilitated by the computing device 103 and the data store nodes 101a . . . 101N. In the depicted example, the data object 153 is stored in the data storage system in a redundant replication storage scheme across the various data store nodes 101. Accordingly, in one example, a data object 153 can be submitted by a client 109 to the data storage application 105 for storage in the data storage system. The data storage application 105 can then facilitate storage of a data object copy 155a . . . 155N in the various data store nodes 101a . . . 101N.

As described above, such a redundant scheme can provide increased data durability, as the data store nodes 101 can be disparately located among multiple server power supplies, server cabinets, data centers, geographic locations, and the like. However, exclusive use of a redundant replication storage scheme results in the need a storage capacity in each of the data store nodes 101 that is at least a factor of N greater than the total size of the data objects stored in the data storage system.

Upon storage of the data object 153 in the data store nodes 101a . . . 101N of the data storage system, the data storage application 105 can index the location of the data object copy 155a . . . 155N in the various data store nodes 101a . . . 101N in the index 111. In one embodiment, the data storage application 105 can generate a unique identifier associated with the data object 153 that is stored in the index 111 in an entry associated with the data object 153 in the index 111. Accordingly, a data store server 119 associated with a data store node 101 can retrieve a data object copy 155 from the data store 121 using this unique identifier. In one example, the data store server 119 can maintain a location in the data store 121 associated with a unique identifier associated with the data object, and the data store server 119 can retrieve a data object copy 155 from its location in the data store 121 when requested by the data storage application 105. Additionally, the data storage application 105 can record any requests to access the data object 153 in the log 113.

Figure 2:
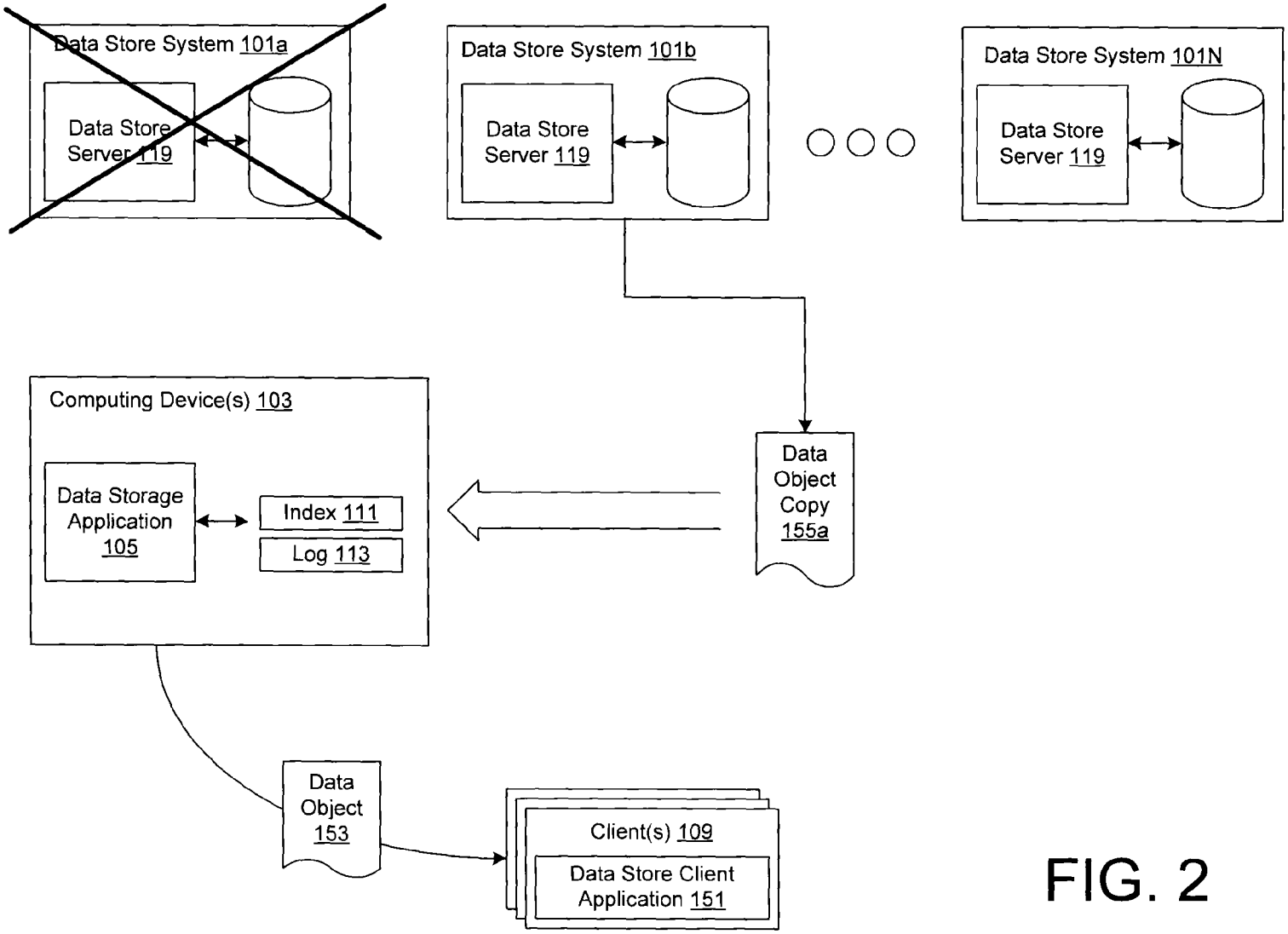

Reference is now made to FIG. 2, which illustrates how the data object 153 can be retrieved from or accessed in the data storage system. Assuming the data store node 101a has failed in some way, because the data object 153 was stored in a redundant replication storage scheme among the data store nodes 101a . . . 101N, the data storage application 105 can respond to a request from a client 109 to retrieve the data object 153 by retrieving a data object copy 155 from any of the other data store nodes 101b . . . 101N. In the depicted example, the data storage application 105 can retrieve a data object copy 155b from the data store node 101b.

Figure 3:
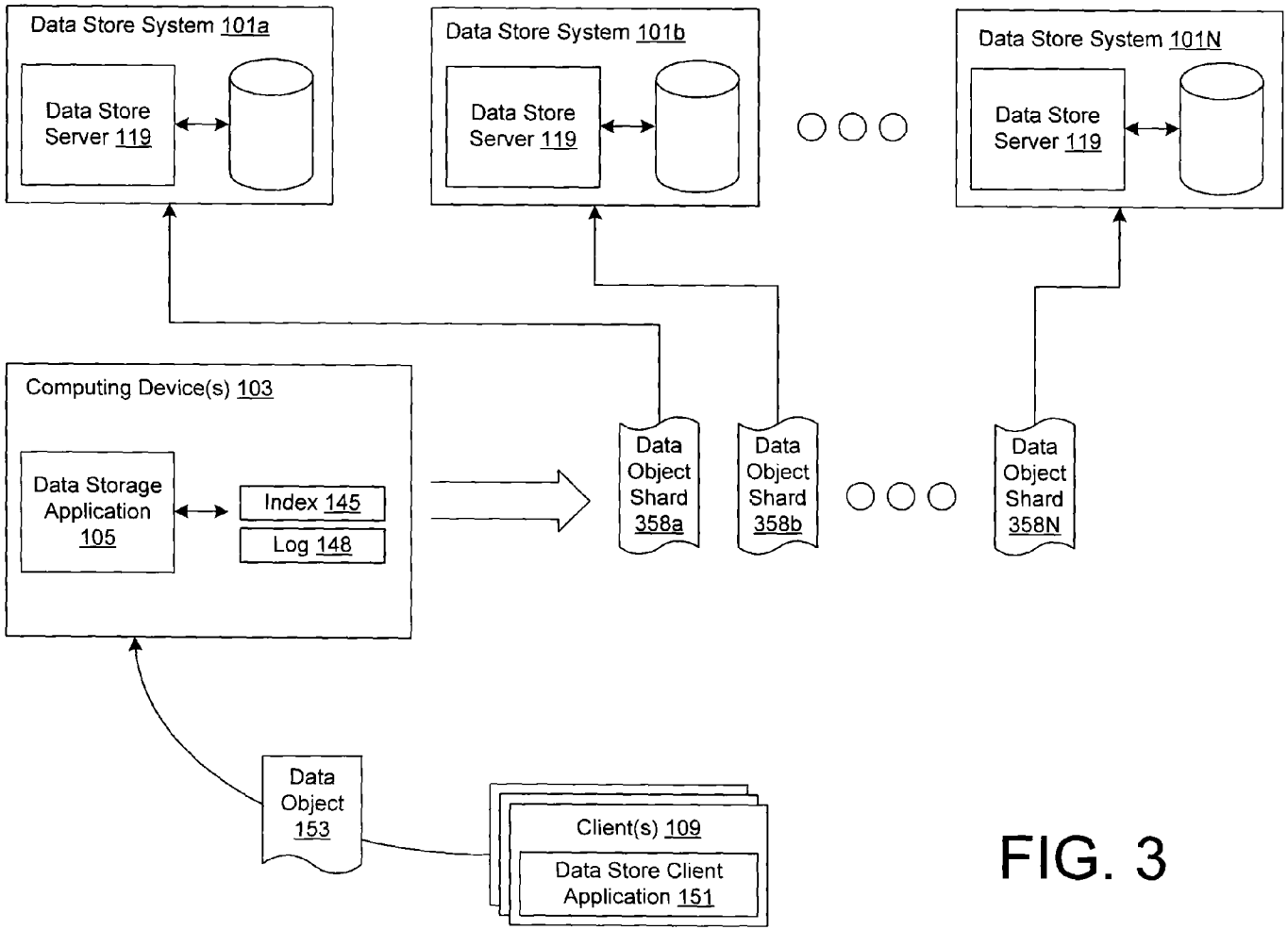

Reference is now made to FIG. 3, which depicts an example of storage of a data object 153 using an erasure encoding storage scheme. In the depicted example, the data storage application 105 can receive a data object 153 from a client 109 for storage in the data storage system. Accordingly, to implement an erasure coding algorithm on the data object 153, the data storage application 105 can split the data object 153 into a first plurality of shards or fragments. The data storage application 105 can then generate additional shards or fragments from the first plurality of shards or fragments as a part of an erasure coding algorithm. The data storage application 105 can then store a subset of these data object shards 358a . . . 358N, which are sized less than the size of the original data object 153, in the data store nodes 101. In one example, the data storage application 105 can store one shard in each of the data store nodes 101a . . . 101N.

Stated another way, in one example, the data storage application 105 can split the data object 153 into k shards, which are sized, to the extent possible, proportionally to the size of the data object 153. In other words, the size of each of the k shards can be expressed as approximately 1/k of the size of the data object 153. Accordingly, from these k shards, the data storage application 105 can generate an additional n-k shards of a size that is similar to the first k shards, resulting in a total of n data object shards 358a . . . 358N associated with the data object 153. Accordingly, one of then data object shards 358 can be stored in each of the data store nodes 101a . . . 101N. Therefore, the amount of data storage needed in the data storage system to store the n data object shards 358 can be expressed as approximately n/k*S, where S is the size of the data object 153. Additionally, by employing an erasure coding algorithm, the data storage application 105 can recover the original data object using any k of then shards, meaning the data object 153 is durably stored until more than n-k data store nodes 101 experience a failure.

In one example, an erasure coding scheme where n is twelve and k is six, which means that in order to store in the data object 153 among the data store nodes 101, a total storage space required in the data storage system is twice the original size of the data object. Additionally, the data is durably stored in the data storage system until seven of the data store nodes 101 experience failure. In contrast, to store the same data object 153 in a redundant replication storage scheme across only three data store nodes 101, the total storage space required in the data storage system is three times the original size of the data object 153.

The data storage application 105 can index a location in the data store nodes 101a . . . 101N in the index 111 so that the data object 153 can be reconstructed and retrieved on behalf of a requesting client 109 as well as log any requests to access the data object 153 in the log 113.

Figure 4:
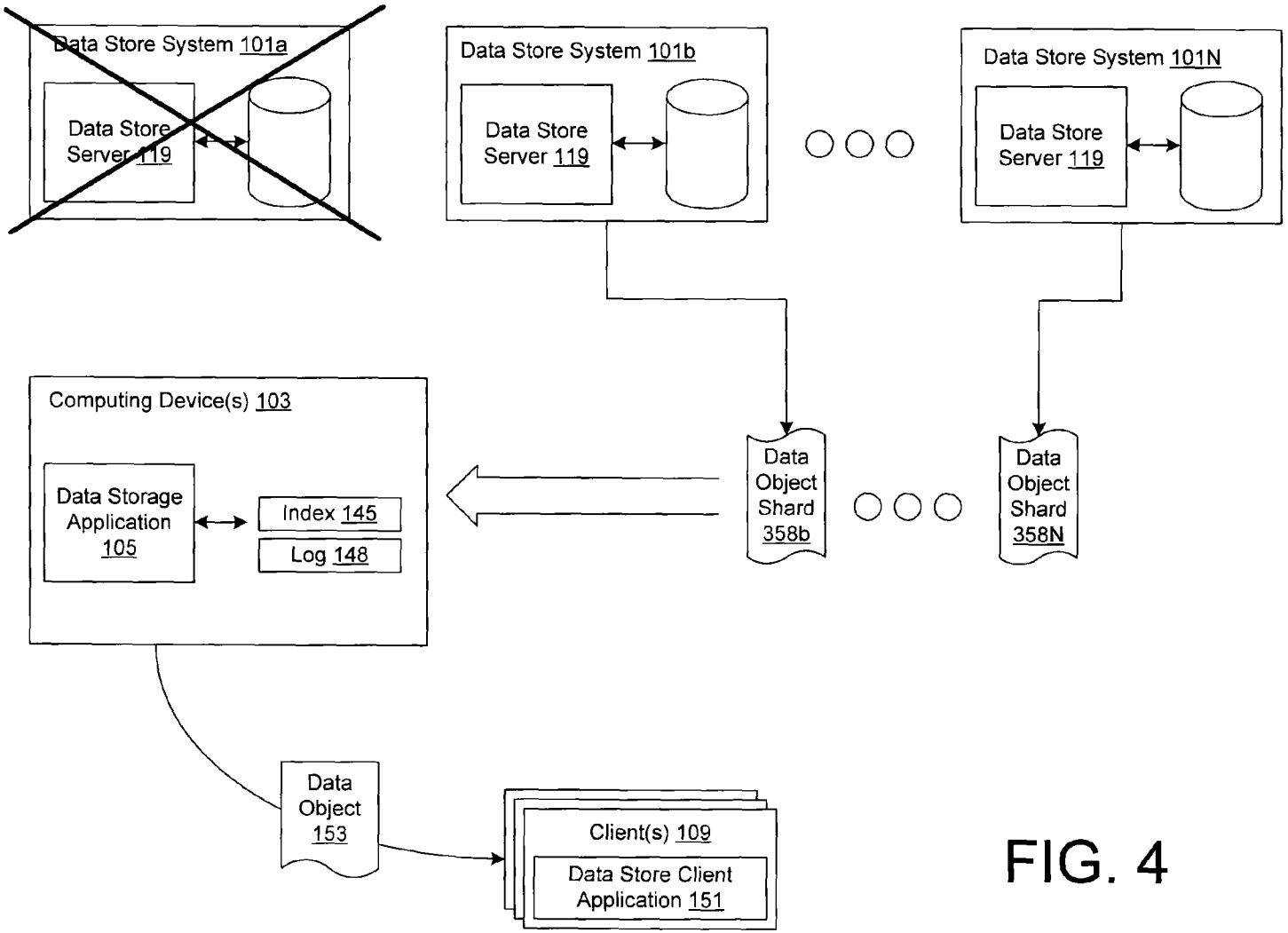

Reference is now made to FIG. 4, which illustrates retrieval of a data object 153 from the data storage application 105. Assuming a failure of one or more data stores nodes 101, upon receiving a request from a client 109 to retrieve a data object 153, the data storage application 105 can reconstruct the data object 153 from a subset of the data object shards 358 stored in the remaining data store nodes 101. As can be appreciated, reconstructing a data object 153 by employing an erasure coding algorithm can be computationally intensive relative to the a redundant replication storage scheme. Additionally, reconstructing a data object 153 can also require more I/O operations, as a plurality of shards must be retrieved from the data store nodes 101 in a data storage system in order to reconstruct the data object 153. Therefore, in some embodiments, although employing an erasure coding scheme can reduce the overall storage requirements to achieve a desired data durability, retrieving a data object 153 stored in an erasure coding storage scheme can result in higher relative latency due to the need to reconstruct the data object 153 from a plurality of data object shards 358.

Accordingly, embodiments of the present disclosure can store data objects using a mix of redundant replication and erasure coding to achieve a desired balance between these storage and performance considerations. In some data storage systems, a large percentage of the overall storage capacity of the data storage system is consumed by relatively few large objects. Additionally, in some data storage systems, a large percentage of the most frequently accessed data storage systems comprise data objects that are relatively small in size. Accordingly, one way to achieve a balance between is to employ an erasure coding storage scheme for those data objects that are relatively large and are rarely accessed. In this way, the total amount of storage space within the data storage system that is devoted to storage of these data objects can be reduced, and the performance degradation of the data storage system due to the need to reconstruct the data object using an erasure coding algorithm when the data object is retrieved is acceptable because the data object is rarely accessed.

Additionally, it can be determined that the performance penalty of accessing a small data object stored in an erasure coding storage scheme that is also rarely accessed may be undesirable, as storing a small object in a redundant replication scheme consumes relatively little storage capacity, even though the data object is rarely accessed. Because, in many data storage systems, there can be a large number of small data objects stored therein, storing small data objects in an erasure coding scheme can result in an unacceptably large index 111, as each of the data object shards associated with the small data object is indexed in the index 111 so that the data storage application 105 can retrieve a shard to reconstruct the data object.

As one illustrative non-limiting example, in some data storage systems, data objects that are sized less than 128 kilobytes (kb) can represent 90% of the total number of data objects stored in the data storage system, whereas these same objects can represent less than 10% of the total storage capacity consumed in the data storage system. Additionally, as another illustrative non-limiting example, these objects that are sized less than 128 kb can represent more than 90% of the data objects that are accessed by clients 109. In other words, these objects can represent more than 90% of "traffic."

Therefore, a data object size distribution of the data objects stored in the data storage system can be generated that can be analyzed to determine a size threshold that represents a relatively small number of data objects that also represents a relatively large amount of the total storage capacity consumed in the data storage system. Additionally, an access pattern distribution can be generated to determine an access threshold that can be related to a size of data objects in the data storage system that are relatively rarely accessed. Accordingly, in one embodiment of the present disclosure, the data storage application 105 can store those objects that are greater than a particular size threshold in an erasure coding storage scheme. Additionally, in another embodiment, the data storage application 105 can store those objects that are rarely accessed in an erasure coding scheme. For example, the data storage application 105 can determine those objects that are rarely accessed over a particular period of time (e.g., the previous twenty-four hours, the previous seven days, the previous thirty days, etc.). As another example, the data storage application 105 can store those objects that are sized greater than or equal to the size threshold and accessed less often during a period of time than the access threshold in an erasure coding scheme.

In some embodiments, the data storage application 105 can continually adapt these thresholds to maintain a balance between data objects stored in a redundant replication scheme and an erasure coding storage scheme. For example, the data storage application 105 can periodically generate an object size distribution and identify a size threshold that represents the largest ten percent of data objects in the data storage system. Continuing this non-limiting example, the data storage application 105 can periodically generate an access pattern distribution and identify an access threshold that represents the ten percent of data objects that are accessed least frequently.

Upon identifying these thresholds, the data storage application 105 can convert a storage scheme of data objects stored in the data storage system in a redundant replication scheme that are greater than the size threshold and/or accessed less often than the access threshold into an erasure coding storage scheme. Additionally, generating an access pattern distribution can also involve identifying those objects that are most frequently accessed in the data storage system. Accordingly, upon identifying these most frequently accessed data objects in the data storage system, the data storage application 105 can also convert a storage scheme of these data objects to a redundant replication storage scheme if they are presently stored in an erasure coding storage scheme. The data storage application 105 can perform this conversion even if the data object is sized greater than the size threshold to reduce the latency associated with retrieval of such a data object. In other words, the data storage application 105 can identify those objects that are "hot," meaning they are frequently accessed, and ensure that they stored in a redundant replication storage scheme.

In one embodiment, the data storage application 105 can generate an object size distribution by scanning the index 111, which can include a data object size entry associated with at least one data object in the data storage system. In another embodiment, the data storage application 105 can scan log entries in the log 113 that may include size information associated with the data objects in the data storages system. In another embodiment, the data storage application 105 can generate an access pattern distribution by scanning an access log associated with the log 113.

In some embodiments, the data storage application 105 can generate an object size distribution and/or an access pattern distribution by sampling the index 111 and/or log 113, as examining each entry in the index 111 and/or log 113 may computationally and/or resource intensive. In the case of generating an access pattern distribution by sampling an access log, for example, such an access pattern distribution may not identify those data objects that are less frequently accessed, as these objects may be associated with few or no entries in such an access log. However, sampling an index 111 and/or log 113 in order to generate an access pattern distribution is likely to identify data objects that are frequently accessed, and the data storage application 105 can identify a data object size associated with these data objects. The data storage application 105 can then ensure that these "hot" data objects are stored in a redundant replication storage scheme, as frequent retrieval of "hot" objects that are large and stored in an erasure coding storage scheme can result in a significant performance penalty because of the computational and I/O resources that may be needed to reconstruct an erasure coded data object.

The various parameters regarding the specific erasure coding storage scheme as well as the redundant replication storages scheme can vary depending on the implementation of an embodiment of the disclosure. Additionally, a data storage system according to the disclosure can employ a varying number of data store nodes 101 depending on cost, performance, and other factors. As one non-limiting example, a data storage system according to the disclosure can mirror a data object copy among three data store nodes when a redundant replication storage scheme is employed for a particular data object. The data storage system, in this example, can also employ an erasure coding scheme where n=6 and k=3, meaning there can be six data object shards stored among six data store nodes. Other variations should be appreciated by a person of ordinary skill in the art.

Figure 5:
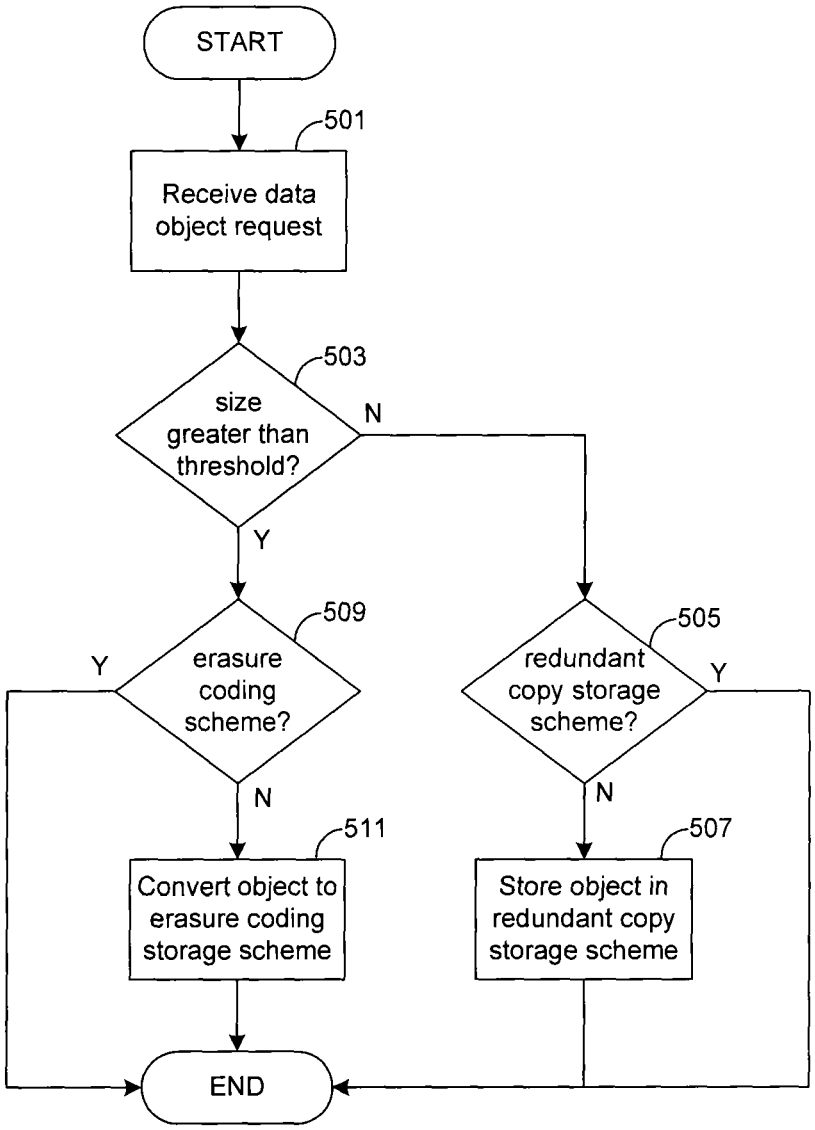
FIGS. 5-7 are flowcharts illustrating one example of functionality implemented as portions of the data storage application executed in a computing device of FIG. 1 according to various embodiments of the present disclosure.
Figure 6:
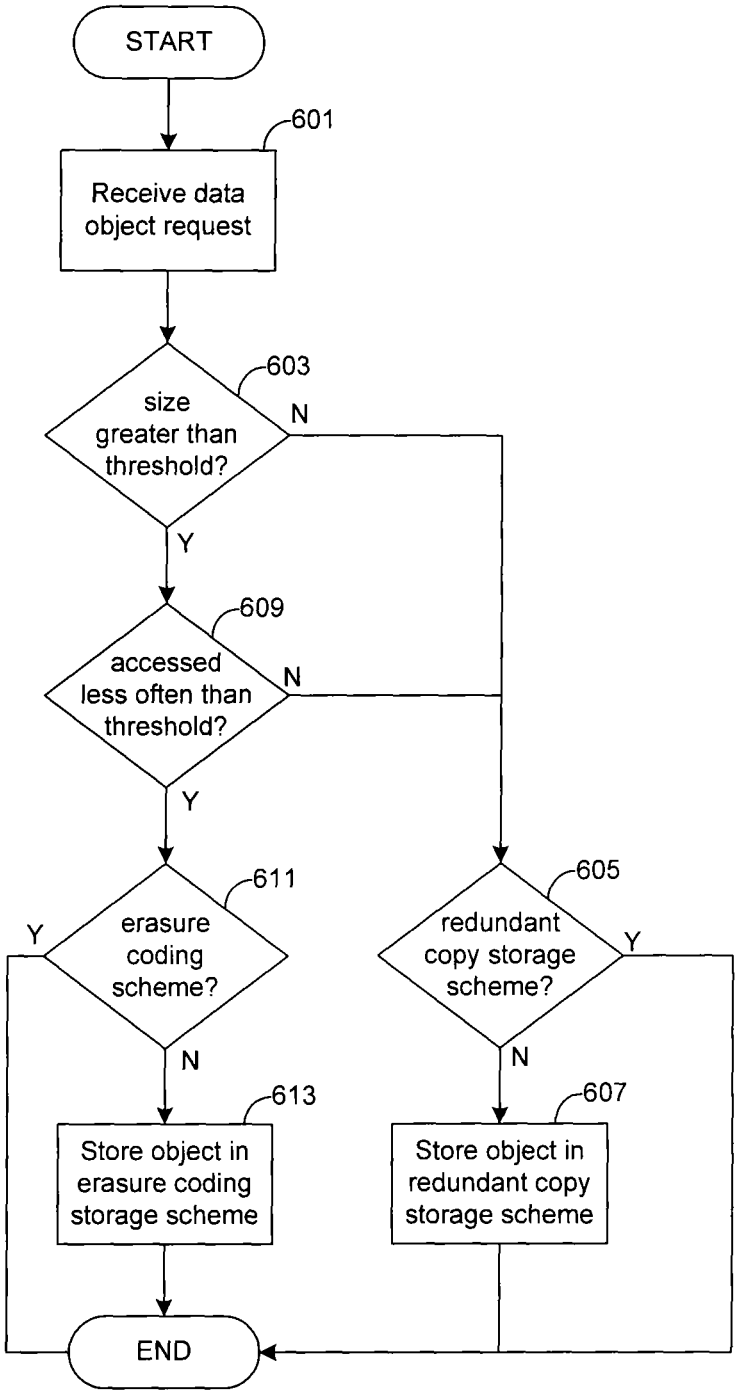
Figure 7:
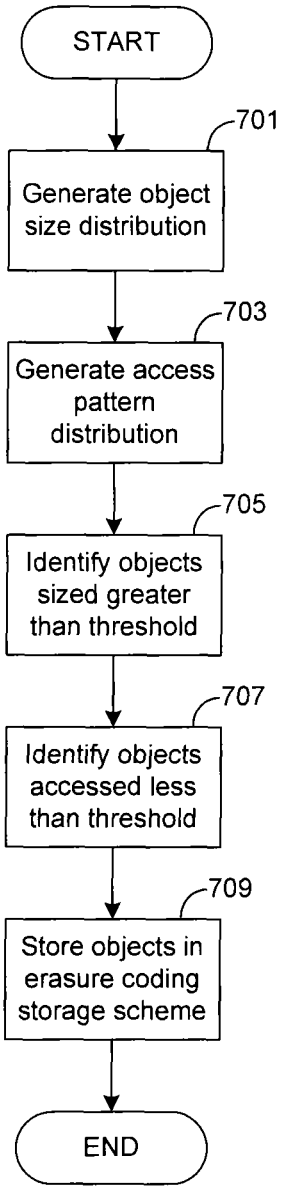

FIGS. 5-7 depict flowcharts that provide non-limiting examples of the operation of a portion of the data storage application 105 according to various embodiments. It is understood that the flowcharts of FIGS. 5-9 provides merely an example of the many different types of functional arrangements that may be employed to implement the operation of the portion of the data storage application 105 as described herein. As an alternative, the flowcharts of FIGS. 5-9 may be viewed as depicting examples of steps of methods implemented in the computing device 103 (FIG. 1) according to one or more embodiments.

FIG. 5 depicts one way in which the data storage application 105 associated with a data storage system can employ a mix of redundant replication as well as erasure coding storage schemes as described herein. In the depicted embodiment, in box 501 the data storage application 105 can receive a data object request, which can include a request to create, access and/or modify a data object in the data storage system. In box 503, the data storage application 105 can determine whether the data object is sized greater than a size threshold. If the data object size is not greater than the size threshold, the data storage application can determine whether the data object is stored in a redundant replication storage scheme in box 505. If the data object is not stored in the data storage system in a redundant replication storage scheme, the data storage application 105 can store the object in a redundant replication scheme in box 507. If the data object size is greater than the size threshold, the data storage application 105 can determine whether the data object is stored in an erasure coding replication scheme in box 509. If the data object is not stored in an erasure coding replication scheme, the data object can be stored in the erasure coding replication scheme in box 511.

FIG. 6 depicts an alternative way in which the data storage application 105 associated with a data storage system can employ a mix of redundant replication as well as erasure coding storage schemes as described herein. In the depicted embodiment, in box 601 the data storage application 105 can receive a data object request, which can include a request to create, access and/or modify a data object in the data storage system. In box 603, the data storage application 105 can determine whether the data object is sized greater than a size threshold. If the data object size is not greater than the size threshold, the data storage application can determine whether the data object is stored in a redundant replication storage scheme in box 605. If the data object is not stored in the data storage system in a redundant replication storage scheme, the data storage application 105 can store the object in a redundant replication scheme in box 607.

If the data object size is greater than the size threshold, the data storage application 105 can determine whether the data object is accessed less often than an access threshold in box 609. If the data object is accessed more often than an access threshold, then the data storage application 105 can proceed to boxes 605 and 607 as described above. If the data object is accessed less than an access threshold, the data storage application 105 can determine whether the data object is stored in an erasure coding replication scheme in box 611. If the data object is not stored in an erasure coding replication scheme, the data object can be stored in the erasure coding replication scheme in box 613.

Accordingly, FIGS. 5-6 represent methods in which the data storage application 105 can, on an object by object basis, assess whether a particular data object that is the subject of a request to retrieve, create and/or modify the object is stored in the data storage system using the appropriate storage scheme. In contrast, FIG. 7 represents a method in which the data storage application 105 can analyze the data objects in a data storage system on a periodic basis and calculate thresholds to determine whether data objects should be stored in a redundant replication storage scheme or an erasure coding storage scheme.

In FIG. 7, in box 701, the data storage application 105 can generate an object size distribution. As described above, an object size distribution can be generated by scanning and/or sampling an index 111 and/or log 113 to determine a distribution of data objects in the data storage system according to their size. A size threshold can be identified based at least upon this distribution. For example, a data object size representing the data object size above which represents ten percent of data objects in the data storages system.

In box 703, the data storage application 105 can generate an access pattern distribution. As described above, an access threshold can be identified that identifies data objects accessed less than an access threshold. In box 705, the data storage application 105 can identify objects sized greater than the size threshold and in box 707, the data storage application 105 can identify from these data objects those that are accessed less than the access threshold. In box 709, these data objects that are greater than the size threshold and accessed less than the access threshold can be stored in an erasure coding scheme.

Figure 8:
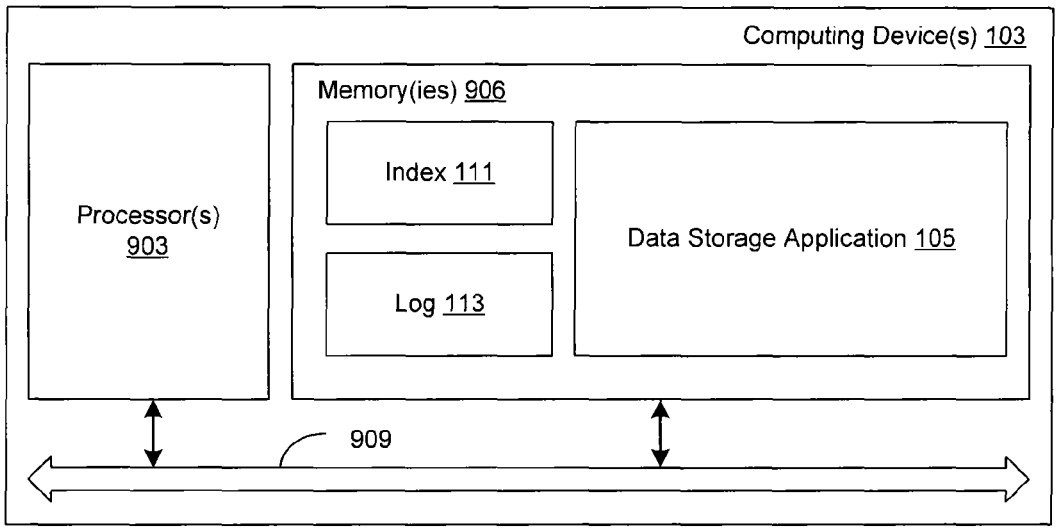
FIG. 8 is a schematic block diagram that provides one example illustration of a computing device employed in the data storage system of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 903 and a memory 906, both of which are coupled to a local interface 909. To this end, the computing device 103 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the data storage application 105, and potentially other applications. In addition, an operating system may be stored in the memory 906 and executable by the processor 903.

It is understood that there may be other applications that are stored in the memory 906 and are executable by the processors 903 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the data storage application 105, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-7 show the functionality and operation of an implementation of portions of the data storage application 105. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 show may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, such as the data storage application 105, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in [a] *at least one* computing device, *wherein* the program[comprising], *when executed, causes the at least one computing device to at least*:

[code that generates] *generate* an object size distribution of a plurality of data objects stored in a data storage system, the data storage system comprising at least one data store;

*periodically determine a size threshold to maintain a balance between data objects stored in a first data replication scheme and a second data replication*

*scheme in the data storage system based at least in part on a number of data objects distributed above or below the size threshold in the object size distribution;*

[code that generates] *generate* an access pattern distribution of the plurality of data objects;

*periodically determine an access frequency threshold to maintain the balance between the data objects stored in the first data replication scheme and the second data replication scheme in the data storage system based at least in part on a number of data objects distributed above or below the access frequency threshold in the access pattern distribution;*

[code that identifies from the object size distribution] *identify* a first at least one object stored in the data storage system that is greater than [a] *the* size threshold, the first at least one object stored in [a] *the* first data replication scheme, the first data replication scheme comprising a redundant replication scheme wherein a copy of the first at least one object is stored in a plurality of data stores in the data storage system;

[code that identifies from the access pattern distribution] *identify* whether the first at least one object is accessed less often than [an] *the* access *frequency* threshold[frequency];

[code that stores] *store* the first at least one object in [a] *the* second data replication scheme in the data storage system when the first at least one object exceeds the size threshold and the first at least one object is accessed less often than the access *frequency* threshold [frequency] over a period of time, the second data replication scheme comprising an erasure coding scheme, wherein the at first least one data object is divided into a plurality of shards, each of the plurality of shards having a size less than an object size of the first at least one object and stored in a respective plurality of data stores in the data storage system;

[code that identifies from the object size distribution] *identify* a second at least one object stored in the data storage system that is less than the size threshold, the second at least one object stored in the second data replication scheme;

[code that identifies from the access pattern distribution] *identify* whether the second at least one object is accessed more often than the access *frequency* threshold[frequency]; and

[code that stores] *store* the second at least one object in the first data replication scheme in the data storage system when the [first] *second* at least one object is either less than the size threshold or the second at least one object is accessed more often than the access *frequency* threshold [frequency] over a period of time.

2. A system, comprising:

at least one computing device; and

*at least one storage device that is accessible to the at least one computing device, the at least one storage device storing* a data storage application executable in the at least one computing device, *wherein* the data storage application[comprising], *when executed, causes the at least one computing device to at least*:

[logic that generates] *generate* an object size distribution of a plurality of data objects stored in a data storage system, the data storage system comprising at least one data store;

*periodically determine a size threshold to maintain a balance between data objects stored in a first data replication scheme and a second data replication scheme in the data storage system based at least in part on a number of data objects distributed above or below the size threshold in the object size distribution;*

[logic that generates] *generate* an access pattern distribution of the plurality of data objects;

*periodically determine an access frequency threshold to maintain the balance between the data objects stored in the first data replication scheme and the second data replication scheme in the data storage system based at least in part on a number of data objects distributed above or below the access frequency threshold in the access pattern distribution;*

[logic that identifies from the object size distribution] *identify* at least one data object stored in the data storage system that is greater than [a] *the* size threshold, the at least one data object stored in [a] *the* first data replication scheme, the first data replication scheme comprising a redundant replication scheme wherein a copy of the at least one data object is stored in a plurality of data stores in the data storage system;

[logic that identifies from the access pattern distribution] *identify* whether the at least one data object is accessed less often than [an] *the* access *frequency* threshold[frequency]; and

[logic that stores] *store* the at least one data object in [a] *the* second replication scheme in the data storage system when the at least one data object exceeds the size threshold and the at least one data object is accessed less often than the access *frequency* threshold [frequency] over a period of time, the second replication scheme comprising an erasure coding scheme, wherein the at least one data object is divided into a plurality of shards, each of the plurality of shards having a size less than an object size of the at least one data object and stored in a respective plurality of data stores in the data storage system.

3. The system of claim 2, wherein the plurality of shards have a total size greater than or equal the at least one data object.

4. The system of claim 2, wherein the data storage application, *when executed,* further [comprises logic that stores] *causes the at least one computing device to at least store* one of the plurality of shards at least a subset of the at least one data store.

5. The system of claim 2, wherein the data storage application, *when executed,* further [comprises] *causes the at least one computing device to at least*:

[logic that identifies] *identify* a location of a subset of the shards in an index accessible to the data storage application;

[logic that retrieves] *retrieve* the subset of the shards from the at least one data store; and

[logic that reconstructs] *reconstruct* the at least one data object from the subset of the shards.

6. The system of claim 2, wherein the [logic that generates the access pattern distribution of the plurality of data objects further comprises] *data storage application, when executed, further causes the at least one computing device to at least*:

[logic that scans] *scan* an access log of the data storage system over a specified period of time; and

[logic that identifies] *identify* at least one data object accessed within the specified period of time.

7. The system of claim 2, wherein the [logic that generates the access pattern distribution of the plurality of data objects further comprises] *data storage application, when executed, further causes the at least one computing device to at least*:

[logic that samples] *sample* an access log of the data storage system over a specified period of time; and

[logic that identifies] *identify* at least one data object accessed within the specified period of time.

8. The system of claim 2, wherein the [logic that generates the access pattern distribution of the plurality of data objects further comprises] *data storage application, when executed, further causes the at least one computing device to at least*:

[logic that scans] *scan* an index of a plurality of data objects stored in the data storage system, the index specifying a storage location in the data storage system of the objects and a most recent access of at least one of the objects; and

[logic that identifies] *identify* at least one data object accessed within a specified period of time.

9. The system of claim 2, wherein the data storage application[further comprises], *when executed, further causes the at least one computing device to at least*:

[logic that receives] *receive* a request to retrieve a data object from the data storage system;

[logic that determines] *determine* whether a size of the data object is greater than the size threshold;

[logic that stores] *store* the data object according to the second replication scheme when the size is greater than the size threshold; and

[logic that stores] *store* the data object according to the first data replication scheme when the size is less than the size threshold.

10. The system of claim 2, wherein the data storage application[further comprises], *when executed, further causes the at least one computing device to at least*:

[logic that receives] *receive* a request to retrieve a data object from the data storage system;

[logic that determines] *determine* whether the data object has been accessed during the period of time more often than the access threshold frequency;

[logic that stores] *store* the data object according to the second replication scheme when the data object has been accessed less often than the access threshold frequency; and

[logic that stores] *store* the data object according to the first data replication scheme when the data object has been accessed during the period of time more often than the access threshold frequency.

11. A method, comprising[the steps of]:

receiving, in at least one computing device, a request to retrieve a data object from a data storage system comprising at least one data store;

[logging, in the at least one computing device, the request in an access log accessible to the at least one computing device;]

*periodically determining, in the at least one computing device, a size threshold to maintain a balance between data objects stored in a first replication scheme and a second replication scheme in the data storage system based at least in part on a number of data objects distributed above or below the size threshold in an object size distribution for the data storage system;* determining, in the at least one computing device, [whether] *that* a size of the data object exceeds [a] *the* size threshold;

determining, in the at least one computing device, [whether] *that* the data object is stored in [a] *the* first replication scheme in the data storage system, the first replication scheme comprising a redundant replication scheme wherein a copy of the data object is stored in a plurality of data stores in the data storage system; *and* encoding, in the at least one computing device, the data object in [a] *the* second replication scheme [when] *in response to determining that* the size exceeds the size threshold, the second replication scheme comprising an erasure coding scheme, wherein the data object is divided into a plurality of shards, each of the plurality of shards having a size less than an object size of the data object and stored in a respective plurality of data stores in the data storage system[; and storing, in the data storage system, the data object in the second replication scheme].

[12. The method of claim 11, further comprising the steps of:

determining, in the at least one computing device, whether the size of the data object is less than the size threshold;

determining, in the at least one computing device, whether the data object is stored in the second replication scheme in the data storage system;

encoding, in the at least one computing device, the data object in the first replication scheme when the size is less than the size threshold; and storing, in the data storage system, the data object in the first replication scheme.]

[13. The method of claim 11, further comprising the steps of:

determining, in the at least one computing device, whether the data object has been accessed less often than an access threshold over a period of time; and storing, in the data storage system, the data object in the second replication scheme if the data object has been accessed less often than the access threshold and the size exceeds the size threshold.]

14. The method of claim 11, [wherein the step of encoding the data object in the second replication scheme further comprises] *further comprising*:

dividing the data object into M fragments;

generating N fragments from the M fragments; *and* storing the N fragments and the M fragments in the at least one data store.

15. The method of claim 14, wherein [the step of] encoding the data object in the second replication scheme further comprises generating an index describing a location of the N fragments and the M fragments corresponding to the data object.

16. The method of claim 14, further comprising [the step of] reconstructing, *in the at least one computing device,* the data object using an erasure coding algorithm, the data object reconstructed using a first number of the N fragments and the M fragments, wherein the first number is at least equal to M.

17. The method of claim 11, [wherein the step of encoding the data object in the second replication scheme further comprises] *further comprising* generating, *in the at least one computing device,* N fragments from the data object, a total storage size of the N fragments being greater than or equal to a size of the data object.

18. The method of claim 17, wherein [the step of storing] *encoding* the data object in the second replication scheme further comprises storing each one of the N fragments in a different one of the respective plurality of data stores in the data storage system.

19. The method of claim 17, further comprising [the step of] reconstructing, *in the at least one computing device,* the data object from a subset of the N fragments.

20. The method of claim 19, wherein [the step of] reconstructing the data object from the subset of the N fragments further comprises [the step of] retrieving a fragment from each of a subset of the respective plurality of data stores in the data storage system.

*21. A system, comprising:*

*at least one computing device; and*

*at least one storage device that is accessible to the at least one computing device, the at least one storage device storing a data storage application executable in the at least one computing device, the data storage application configured to cause the at least one computing device to at least:*

*receive a request to store a data object in a data storage system, the data storage system comprising a plurality of data stores;*

*generate an object size distribution for the data storage system;*

*periodically determine a size threshold to maintain a balance between data objects stored in a redundant replication scheme and an erasure coding scheme in the data storage system based at least in part on a number of data objects distributed above or below the size threshold in the object size distribution;*

*determine whether an object size of the data object meets the size threshold;*

*store the data object in the data storage system using the redundant replication scheme when the object size fails to meet the size threshold, wherein the redundant replication scheme comprises a first scheme in which a copy of the data object is stored in a first at least two of the plurality of data stores; and*

*store the data object using the erasure coding scheme in the data storage system when the object size meets the size threshold, the erasure coding scheme comprising a second scheme in which the data object is divided into a plurality of shards, individual ones of the plurality of shards having a size less than the object size and stored in a second at least two of the plurality of data stores.*

*22. The system of claim 21, wherein the data storage application is further configured to cause the at least one computing device to at least:*

*determine whether an access frequency of the data object meets an access frequency threshold;*

*store the data object in the data storage system using the redundant replication scheme when the access frequency meets the access frequency threshold; and*

*store the data object in the data storage system using the erasure coding scheme when the access frequency does not meet the access frequency threshold and the object size meets the size threshold.*

*23. The system of claim 21, wherein the plurality of shards have a total combined size that is greater than or equal to the object size.*

*24. The system of claim 21, wherein the data storage application is further configured to cause the at least one computing device to at least store one of the plurality of shards in a respective one of the second at least two of the plurality of data stores.*

*25. The system of claim 21, wherein the data storage application is further configured to cause the at least one computing device to at least:*

*identify a location of a subset of the plurality of shards in an index accessible to the data storage application;*

*retrieve the subset of the plurality of shards; and*

*reconstruct the data object from the subset of the shards.*

*26. The system of claim 21, wherein the data storage application is further configured to cause the at least one computing device to at least:*

*generate an access pattern distribution for the data storage system;*

*identify another data object stored in the data storage system having another object size that meets the size threshold, the other data object stored using the redundant replication scheme;*

*identify whether an access frequency associated with the other data object fails to meet an access frequency threshold; and*

*store the other data object using the erasure coding scheme responsive to identifying that the other object size meets the size threshold and the access frequency does not meet the access frequency threshold.*

*27. The system of claim 26, wherein the access pattern distribution of the plurality of data objects is generated by:*

*scanning an access log of the data storage system over a specified period of time; and*

*identifying at least one entry corresponding to the other data object within the access log over the specified period of time.*

*28. The system of claim 27, wherein the access log is scanned by sampling the access log over the specified period of time.*

*29. The system of claim 26, wherein the access pattern distribution of the plurality of data objects is generated by:*

*scanning an index of the plurality of data objects stored in the data storage system, the index specifying a storage location in the data storage system of the plurality of data objects and a most recent access of at least one of the data objects; and*

*identifying at least one entry in the index corresponding to the other data object within a specified period of time.*

*30. The system of claim 21, wherein the data storage application is further configured to cause the at least one computing device to at least:*

*receive a request to retrieve another data object from the data storage system;*

*determine whether another size of the other data object meets the size threshold;*

*store the other data object using the erasure coding scheme when the other size meets the size threshold; and*

*store the data object using the redundant replication scheme when the other size does not meet the size threshold.*

*31. The system of claim 21, wherein the data storage application is further configured to cause the at least one computing device to at least:*

*receive a request to retrieve another data object from the data storage system;*

*determine whether an access frequency associated with the other data object meets an access frequency threshold;*

*store the other data object using the erasure coding scheme when the access frequency does not meet the access frequency threshold; and*

*store the other data object according to the redundant replication scheme when the access frequency meets the access frequency threshold.*

*32. A method, comprising:*

*obtaining, by at least one computing device, a request to store a data object in a data storage system comprising a plurality of data stores;*

*generating, by the at least one computing device, an object size distribution for the data storage system;*

*periodically determining, by the at least one computing device, a size threshold to maintain a balance between data objects stored in a redundant replication scheme and an erasure coding scheme in the data storage system based at least in part on a number of data objects distributed above or below the size threshold in the object size distribution;*

*determining, by the at least one computing device, that an object size of the data object fails to meet the size threshold;*

*storing, by the at least one computing device, the data object in the data storage system using the redundant replication scheme instead of the erasure coding scheme responsive to determining that the object size fails to meet the size threshold, wherein the redundant replication scheme comprises a scheme in which a copy of the data object is stored in a first at least two of the plurality of data stores; and*

*storing, by the at least one computing device, another data object in the data storage system using the erasure coding scheme, wherein the other data object is divided into a plurality of shards, each of the plurality of shards having a size less than an object size of the other data object and stored in a respective plurality of data stores in the data storage system.*

*33. The method of claim 32, further comprising:*

*determining, by the at least one computing device, that an access frequency associated with the data object meets an access frequency threshold over a period of time;*

*determining, by the at least one computing device, that the data object is stored in the erasure coding scheme; and*

*in response to determining that the access frequency associated with the data object meets the access frequency threshold, the data object is stored in the erasure coding scheme, and the object size meets the size threshold:*

*encoding, by the at least one computing device, the data object using the redundant replication scheme; and*

*storing, by the at least one computing device, the data object using the redundant replication scheme in the data storage system.*

*34. A system, comprising:*

*at least one computing device; and*

*at least one storage device that is accessible to the at least one computing device, the at least one storage device storing a data storage application executable in the at least one computing device, the data storage application configured to cause the at least one computing device to at least:*

*generate an access pattern distribution of a plurality of data objects stored in a data storage system, the data storage system comprising at least one data store;*

*periodically determine an access frequency threshold to maintain a balance between data objects stored in a redundant replication scheme and an erasure coding scheme in the data storage system based at least in part on a number of data objects distributed above or below the access frequency threshold in the access pattern distribution;*

*identify a data object stored in the data storage system having an access frequency that fails to meet the access frequency threshold, the data object stored in the data storage system using the redundant replication scheme wherein a copy of the data object is stored in a plurality of data stores in the data storage system; and*

*store the data object in the data storage system in the erasure coding scheme, wherein the data object is divided into a plurality of shards, each of the plurality of shards having a size of less than an object size of the data object, each of the plurality of shards being stored in a respective plurality of data stores in the data storage system.*

*35. The system of claim 34, wherein the data storage application is further configured to cause the at least one computing device to at least:*

*identify another data object from the access pattern distribution that is stored in the data storage system having another access frequency that meets the access frequency threshold, the other data object stored in the data storage system using the erasure coding scheme; and*

*store the other data object in the data storage system using the redundant replication scheme.*

*36. The system of claim 34, wherein the plurality of shards have a total size greater than or equal the data object.*

*37. The system of claim 34, wherein the data storage application is further configured to cause the at least one computing device to at least store one of the plurality of shards at least a subset of the at least one data store.*

*38. The system of claim 34, wherein the data storage application is further configured to cause the at least one computing device to at least:*

*identify a location of a subset of the shards in an index accessible to the data storage application;*

*retrieve the subset of the shards from the at least one data store; and*

*reconstruct the data object from the subset of the shards.*

*39. The system of claim 34, wherein the access pattern distribution of the plurality of data objects is generated by:*

*scanning an access log of the data storage system over a specified period of time; and*

*identifying the data object accessed within the specified period of time.*

*40. The system of claim 34, wherein the access pattern distribution of the plurality of data objects is generated by:*

*sampling an access log of the data storage system over a specified period of time; and*

*identifying the data object accessed within the specified period of time.*

*41. The system of claim 34, wherein the access pattern distribution of the plurality of data objects is generated by:*

*scanning an index of a plurality of data objects stored in the data storage system, the index specifying a storage location in the data storage system of the data objects and a most recent access of at least one of the data objects; and*

*identifying the data object accessed within a specified period of time.*

*42. A method comprising:*

*obtaining, in at least one computing device, a request to retrieve a data object from a data storage system comprising at least one data store;*

*logging, in the at least one computing device, the request in an access log accessible to the at least one computing device;*

*determining, in the at least one computing device, that an access frequency of the data object fails to meet an access frequency threshold;*

*determining, in the at least one computing device, that the data object is stored in a first replication scheme in the data storage system, the first replication scheme comprising a redundant replication scheme wherein a copy of the data object is stored in a plurality of data stores in the data storage system;*

*generating, by the at least one computing device, an object size distribution for the data storage system;*

*periodically determining, by the at least one computing device, a size threshold to maintain a balance between data objects stored in the first replication scheme and a second replication scheme in the data storage system based at least in part on a number of data objects distributed above or below the size threshold in the object size distribution; and*

*encoding, in the at least one computing device, the data object in the second replication scheme responsive to determining that the access frequency fails to meet the access frequency threshold and that a size of the data object meets the size threshold, the second replication scheme comprising an erasure coding scheme, wherein the data object is divided into a plurality of shards, each of the plurality of shards having a size less than an object size of the data object and stored in a respective plurality of data stores in the data storage system.*

*43. The method of claim 42, wherein encoding the data object in the second replication scheme further comprises:*

*dividing the data object into M fragments;*

*generating N fragments from the M fragments; and*

*storing the N fragments and the M fragments in the at least one data store.*

*44. The method of claim 43, wherein the step of encoding the data object in the second replication scheme further comprises generating an index describing a location of the N fragments and the M fragments corresponding to the data object.*

*45. The method of claim 43, further comprising reconstructing the data object using an erasure coding algorithm, the data object reconstructed using a first number of the N fragments and the M fragments, wherein the first number is at least equal to M.*

*46. The method of claim 42, wherein encoding the data object in the second replication scheme further comprises generating N fragments from the data object, a total storage size of the N fragments being greater than or equal to a size of the data object.*

*47. The method of claim 46, wherein encoding the data object in the second replication scheme further comprises storing each one of the N fragments in a different one of the respective plurality of data stores in the data storage system.*

*48. A system, comprising:*

*at least one computing device; and*

*at least one storage device that is accessible to the at least one computing device, the at least one storage device storing a data storage application executable in the at least one computing device, the data storage application configured to cause the at least one computing device to at least:*

*generate an object size distribution of a plurality of data objects stored in a data storage system, the data storage system comprising at least one data store;*

*generate an access pattern distribution of the plurality of data objects;*

*periodically determine a size threshold to maintain a balance between data objects stored in a first replication scheme and a second replication scheme in the data storage system based at least in part on a number of data objects distributed above or below the size threshold in the object size distribution;*

*identify at least one data object stored in the data storage system that fails to meet the size threshold, the at least one data object stored in the first replication scheme, the first replication scheme comprising an erasure coding scheme in which the at least one data object is divided into a plurality of shards, each of the plurality of shards having a size less than an object size of the at least one data object and stored in a respective plurality of data stores in the data storage system;*

*identify that the at least one data object is accessed more often than an access frequency threshold; and*

*store the at least one data object in the second replication scheme in the data storage system responsive to determining that the at least one data object fails to meet the size threshold and the at least one data object is accessed more often than the access frequency threshold over a period of time, the second replication scheme comprising a redundant replication scheme in which a copy of the at least one data object is stored in another respective plurality of data stores in the data storage system.*

*49. The system of claim 48, wherein the plurality of shards have a total size greater than or equal the at least one data object.*

*50. The system of claim 48, wherein the data storage application is further configured to cause the at least one computing device to at least store at least one of the plurality of shards in the at least one data store.*

*51. The system of claim 48, wherein the data storage application is further configured to cause the at least one computing device to at least:*

*identify a location of a subset of the shards in an index accessible to the data storage application;*

*retrieve the subset of the shards from the at least one data store; and*

*reconstruct the at least one data object from the subset of the shards.*

*52. The system of claim 48, wherein the access pattern distribution of the plurality of data objects is generated by:*

*scanning an access log of the data storage system over a specified period of time; and*

*identifying at least one data object accessed within the specified period of time.*

*53. The system of claim 48, wherein the access pattern distribution of the plurality of data objects is generated by:*

*sampling an access log of the data storage system over a specified period of time; and*

*identifying at least one data object accessed within the specified period of time.*

*54. The system of claim 48, wherein the access pattern distribution of the plurality of data objects is generated by:*

*scanning an index of a plurality of data objects stored in the data storage system, the index specifying a storage location in the data storage system of the objects and a most recent access of at least one of the objects; and*

*identifying at least one data object accessed within a specified period of time.*

*55. The system of claim 48, wherein the data storage application is further configured to cause the at least one computing device to at least:*

*receive a request to retrieve a data object from the data storage system;*

*determine whether a size of the data object meets the size threshold;*

*store the data object according to the first replication scheme responsive to determining that the size of the data object meets the size threshold and the data object was previously stored according to the second replication scheme; and*

*store the data object according to the second replication scheme responsive to determining that the size of the data object fails to meet the size threshold and the data object was previously stored according to the first replication scheme.*

*56. The system of claim 48, wherein the data storage application is further configured to cause the at least one computing device to at least:*

*receive a request to retrieve a data object from the data storage system;*

*determine whether an access frequency of the data object meets the access frequency threshold;*

*store the data object according to the second replication scheme responsive to determining that the access frequency meets the access frequency threshold and the data object was previously stored according to the first replication scheme; and*

*store the data object according to the first replication scheme when the access frequency fails to meet the access frequency threshold and the data object was previously stored according to the second replication scheme.*

*57. A method comprising:*

*receiving, in at least one computing device, a request to retrieve a data object from a data storage system comprising at least one data store;*

*logging, in the at least one computing device, the request in an access log accessible to the at least one computing device;*

*generating, in the at least one computing device, an object size distribution for the data storage system;*

*periodically determining, in the at least one computing device, a size threshold to maintain a balance between data objects stored in a first replication scheme and a second replication scheme in the data storage system based at least in part on a number of data objects distributed above or below the size threshold in the object size distribution;*

*determining, in the at least one computing device, that the object size of the data object fails to meet the size threshold;*

*determining, in the at least one computing device, that the data object is stored in the first replication scheme in the data storage system, the first replication scheme comprising an erasure coding scheme, wherein the data object is divided into a plurality of shards, each of the plurality of shards having a size less than the object size of the data object and stored in a respective plurality of data stores in the data storage system; and*

*encoding, in the at least one computing device, the data object in the second replication scheme responsive to determining that the size fails to meet the size threshold and the data object is stored according to the first replication scheme, the second replication scheme comprising a redundant replication scheme wherein a copy of the data object is stored in another respective plurality of data stores in the data storage system.*

*58. The method of claim 57, further comprising:*

*determining, in the at least one computing device, whether an access frequency of the data object meets an access frequency threshold over a period of time; and*

*encoding, in the data storage system, the data object in the second replication scheme responsive to determining that the access frequency meets the access frequency threshold and the data object was previously stored using the first replication scheme.*

*59. A non-transitory computer-readable medium embodying a program executable by at least one computing device, the program, when executed, configured to cause at least one computing device to at least:*

*receive a request to store a data object in a data storage system, the data storage system comprising a plurality of data stores;*

*determine whether a size of the data object meets a size threshold that is periodically determined to maintain a balance between data objects stored in a redundant replication scheme and an erasure coding scheme in the data storage system and depends upon a number of data objects distributed above or below the size threshold in an object size distribution of a plurality of data objects stored in the data storage system;*

*store the data object in the data storage system using the redundant replication scheme in response to the size of the data object not meeting the size threshold, wherein the redundant replication scheme comprises a first scheme in which a copy of the data object is stored in a first at least two of the plurality of data stores; and*

*store the data object using the erasure coding scheme in the data storage system in response to the size of the data object meeting the size threshold, the erasure coding scheme comprising a second scheme in which the data object is divided into a plurality of shards, individual ones of the plurality of shards having a size less than an object size and stored in a second at least two of the plurality of data stores.*

*60. The non-transitory computer-readable medium of claim 59, wherein the plurality of shards have a total combined size that is greater than or equal to the object size.*

*61. The non-transitory computer-readable medium of claim 59, wherein the program is further configured to cause the at least one computing device to at least store one of the plurality of shards in a respective one of the second at least two of the plurality of data stores.*

*62. The non-transitory computer-readable medium of claim 59, wherein the program is further configured to cause the at least one computing device to at least:*

*identify a location of a subset of the plurality of shards in an index accessible to the data storage application;*

*retrieve the subset of the plurality of shards; and*

*reconstruct the data object from the subset of the shards.*

*63. The non-transitory computer-readable medium of claim 59, wherein the program is further configured to cause the at least one computing device to at least:*

*generate the object size distribution;*

*generate an access pattern distribution of the plurality of data objects;*

*identify another data object stored in the data storage system having another object size that meets the size threshold, the other data object stored using the redundant replication scheme;*

*identify, from the access pattern distribution, whether an access frequency associated with the other data object fails to meet an access frequency threshold; and*

*store the other data object using the erasure coding scheme when the other object size meets the size threshold and the access frequency does not meet the access frequency threshold.*

*64. The non-transitory computer-readable medium of claim 63, wherein the access pattern distribution of the plurality of data objects is generated by:*

*scanning an access log of the data storage system over a specified period of time; and*

*identifying at least one entry corresponding to the other data object within the access log over the specified period of time.*

*65. The non-transitory computer-readable medium of claim 64, wherein the access log is scanned by sampling the access log over the specified period of time.*

*66. The non-transitory computer-readable medium of claim 63, wherein the access pattern distribution of the plurality of data objects is generated by:*

*scanning an index of the plurality of data objects stored in the data storage system, the index specifying a storage location in the data storage system of the plurality of data objects and a most recent access of at least one of the data objects; and*

*identifying at least one entry in the index corresponding to the other data object within a specified period of time.*

*67. A system, comprising:*

*at least one computing device; and*

*at least one storage device that is accessible to the at least one computing device, the at least one storage device storing a data storage application executable in the at least one computing device, the data storage application configured to cause the at least one computing device to at least:*

*receive a request to store a data object in a data storage system, the data storage system comprising a plurality of data stores;*

*determine whether a size of the data object meets a size threshold that is periodically determined to maintain a balance between data objects stored in a redundant replication scheme and an erasure coding scheme in the data storage system and depends upon a number of data objects distributed above or below the size threshold in an object size distribution of a plurality of data objects stored in the data storage system;*

*store the data object in the data storage system using the redundant replication scheme in response to the size of the data object not meeting the size threshold, wherein the redundant replication scheme comprises a first scheme in which a copy of the data object is stored in a first at least two of the plurality of data stores; and*

*store the data object using the erasure coding scheme in the data storage system in response to the size of the data object meeting the size threshold, the erasure coding scheme comprising a second scheme in which the data object is divided into a plurality of shards, individual ones of the plurality of shards having a size less than an object size and stored in a second at least two of the plurality of data stores.*

*68. The system of claim 67, wherein the plurality of shards have a total combined size that is greater than or equal to the object size.*

*69. The system of claim 67, wherein the data storage application is further configured to cause the at least one computing device to at least store one of the plurality of shards in a respective one of the second at least two of the plurality of data stores.*

*70. The system of claim 67, wherein the data storage application is further configured to cause the at least one computing device to at least:*

*identify a location of a subset of the plurality of shards in an index accessible to the data storage application;*

*retrieve the subset of the plurality of shards; and*

*reconstruct the data object from the subset of the shards.*

*71. The system of claim 67, wherein the data storage application is further configured to cause the at least one computing device to at least:*

*generate the object size distribution;*

*generate an access pattern distribution of the plurality of data objects;*

*identify, from the object size distribution, another data object stored in the data storage system having another object size that meets the size threshold, the other data object stored using the redundant replication scheme;*

*identify, from the access pattern distribution, whether an access frequency associated with the other data object fails to meet an access frequency threshold; and*

*store the other data object using the erasure coding scheme when the other object size meets the size threshold and the access frequency does not meet the access frequency threshold.*

*72. The system of claim 71, wherein the access pattern distribution of the plurality of data objects is generated by:*

*scanning an access log of the data storage system over a specified period of time; and*

*identifying at least one entry corresponding to the other data object within the access log over the specified period of time.*

*73. The system of claim 72, wherein the access log is scanned by sampling the access log over the specified period of time.*

*74. The system of claim 71, wherein the access pattern distribution of the plurality of data objects is generated by:*

*scanning an index of the plurality of data objects stored in the data storage system, the index specifying a storage location in the data storage system of the plurality of data objects and a most recent access of at least one of the data objects; and*

*identifying at least one entry in the index corresponding to the other data object within a specified period of time.*

*75. The system of claim 67, wherein the data storage application is further configured to cause the at least one computing device to at least:*

*receive a request to retrieve another data object from the data storage system;*

*determine whether another size of the other data object meets the size threshold;*

*store the other data object using the erasure coding scheme when the other size meets the size threshold; and*

*store the data object using the redundant replication scheme when the other size does not meet the size threshold.*

*76. The system of claim 67, wherein the data storage application is further configured to cause the at least one computing device to at least:*

*receive a request to retrieve another data object from the data storage system;*

*determine whether an access frequency associated with the other data object meets an access frequency threshold;*

*store the other data object using the erasure coding scheme when the access frequency does not meet the access frequency threshold; and*

*store the other data object according to the redundant replication scheme when the access frequency meets the access frequency threshold.*

*77. A method, comprising:*

*obtaining, by at least one computing device, a request to store a data object in a data storage system comprising a plurality of data stores;*

*determining, by the at least one computing device, that a size of the data object meets a size threshold that is periodically determined to maintain a balance between data objects stored in a redundant replication scheme and an erasure coding scheme in the data storage system and depends upon a number of data objects distributed above or below the size threshold in an object size distribution of a plurality of data objects stored in the data storage system;*

*storing, by the at least one computing device, the data object using the erasure coding scheme in the data storage system instead of the redundant replication scheme in response to the size of the data object meeting the size threshold, the erasure coding scheme comprising a scheme in which the data object is divided into a plurality of shards, individual ones of the plurality of shards having a size less than an object size and stored in at least two of the plurality of data stores; and*

*storing, by the at least one computing device, another data object in the data storage system using the redundant replication scheme, wherein a copy of the other data object is stored in another at least two of the plurality of data stores in the data storage system.*

*78. The method of claim 77, further comprising:*

*dividing the data object into M fragments;*

*generating N fragments from the M fragments; and*

*storing the N fragments and the M fragments in the at least two of the plurality of data stores.*

*79. The method of claim 78, further comprising reconstructing the data object using a first number of fragments selected from the N fragments and the M fragments, wherein the first number is less than N+M.*

*80. The method of claim 77, further comprising generating N fragments from the data object, wherein a total size of the N fragments is at least as great as the object size.*

*81. The method of claim 80, wherein the storing the data object in the erasure coding scheme further comprises storing individual ones of the N fragments in different ones of the at least two of the plurality of data stores in the data storage system.*

*82. The method of claim 81, further comprising reconstructing the data object from a subset of the N fragments.*

*83. A system, comprising:*

*at least one computing device; and*

*at least one storage device that is accessible to the at least one computing device, the at least one storage device storing a data storage application executable in the at least one computing device, the data storage application configured to cause the at least one computing device to at least:*

*perform an analysis of a data storage system to generate an object size distribution for the data storage system, the data storage system comprising at least one data store;*

*periodically determine a size threshold to maintain a balance between data objects stored in a first data replication scheme and a second data replication scheme in the data storage system based at least in part on a number of data objects distributed above or below the size threshold in the object size distribution;*

*identify whether a data object is stored in the data storage system in at least one of the first data replication scheme or the second data replication scheme, the first data replication scheme comprising a redundant replication scheme wherein a copy of the data object is stored in a plurality of data stores in the data storage system and the second data replication scheme comprising an erasure coding scheme, wherein the data object is divided into a plurality of shards, each of the plurality of shards having a size less than an object size of the data object and stored in a respective plurality of data stores in the data storage system;*

*determine whether an object size of the data object meets the size threshold; and*

*store the data object in one of the first data replication scheme or the second data replication scheme in the data storage system based at least in part upon whether the data object meets the size threshold.*

*84. The system of claim 83, wherein the data storage application is further configured to cause the at least one computing device to store the data object in the one of the first data replication scheme or the second data replication scheme further based at least in part upon an access frequency of the data object.*

*85. The system of claim 83, wherein the data object is stored in the second data replication scheme by:*

*dividing the data object into M fragments;*

*generating N fragments from the M fragments; and*

*storing the N fragments and the M fragments in the respective plurality of data stores.*

*86. The system of claim 85, wherein the data storage application is further configured to reconstruct the data object using a first number of fragments selected from the N fragments and the M fragments, wherein the first number is less than N+M.*

*87. The system of claim 83, wherein the data object is stored in the second data replication scheme by generating N fragments from the data object, wherein a total size of the N fragments is at least as great as the object size.*

*88. The system of claim 87, wherein the data object is stored in the second data replication scheme by storing individual ones of the N fragments in different ones of at least two plurality of data stores in the data storage system.*

*89. The system of claim 88, wherein the data storage application is further configured to reconstruct the data object from a subset of the N fragments.*

*90. A method, comprising:*

*performing, by at least one computing device, an analysis of a data storage system to generate an object size distribution for the data storage system, the data storage system comprising at least one data store;*

*periodically determining, by the at least one computing device, a size threshold to maintain a balance between data objects stored in a first data replication scheme and a second data replication scheme in the data*

*storage system based at least in part on a number of data objects distributed above or below the size threshold in the object size distribution;*

*identifying, by the at least one computing device, whether a data object is stored in the data storage system in at least one of the first data replication scheme or the second data replication scheme, the first data replication scheme comprising a redundant replication scheme wherein a copy of the data object is stored in a plurality of data stores in the data storage system and the second data replication scheme comprising an erasure coding scheme, wherein the data object is divided into a plurality of shards, each of the plurality of shards having a size less than an object size of the data object and stored in a respective plurality of data stores in the data storage system;*

*determining, by the at least one computing device, whether an object size of the data object meets the size threshold; and*

*storing, by the at least one computing device, the data object in one of the first data replication scheme or the second data replication scheme in the data storage system based at least in part upon whether the data object meets the size threshold.*

*91. The method of claim 90, wherein the at least one computing device stores the data object in the one of the first data replication scheme or the second data replication scheme further based at least in part upon an access frequency of the data object.*

*92. The method of claim 90, wherein the data object is stored in the second data replication scheme by:*

*dividing the data object into M fragments;*

*generating N fragments from the M fragments; and*

*storing the N fragments and the M fragments in at least two data stores.*

*93. The method of claim 92, further comprising reconstructing the data object using a first number of fragments selected from the N fragments and the M fragments, wherein the first number is less than N+M.*

*94. The method of claim 90, wherein the data object is stored in the second data replication scheme by generating N fragments from the data object, wherein a total size of the N fragments is at least as great as the object size.*

*95. The method of claim 94, wherein the data object is stored in the second data replication scheme by storing individual ones of the N fragments in different ones of at least two plurality of data stores in the data storage system.*

*96. The system of claim 95, further comprising reconstructing the data object from a subset of the N fragments.*

*97. A system, comprising:*

*at least one computing device; and*

*at least one storage device that is accessible to the at least one computing device, the at least one storage device storing a data storage application executable in the at least one computing device, the data storage application configured to cause the at least one computing device to at least:*

*generate an object size distribution of a plurality of data objects stored in a data storage system, the data storage system comprising at least one data store;*

*periodically determine a size threshold to maintain a balance between data objects stored in a redundant replication scheme and an erasure coding scheme in the data storage system based at least in part upon a number of data objects distributed above or below the size threshold in the object size distribution;*

*identify a data object stored in the data storage system having an object size that meets the size threshold, the data object stored in the data storage system using the redundant replication scheme, wherein a copy of the data object is stored in a plurality of data stores in the data storage system; and*

*store the data object in the data storage system in the erasure coding scheme, wherein the data object is divided into a plurality of shards, each of the plurality of shards having a size of less than an object size of the data object, each of the plurality of shards being stored in a respective plurality of data stores in the data storage system.*

*98. The system of claim 97, wherein the data storage application is further configured to cause the at least one computing device to at least:*

*identify another data object from the object size distribution that is stored in the data storage system having another object size that fails to meet the object size threshold, the other data object stored in the data storage system using the erasure coding scheme; and*

*store the other data object in the data storage system in the redundant replication scheme.*

*99. The system of claim 97, wherein the plurality of shards have a total size greater than or equal the data object.*

*100. The system of claim 97, wherein the data storage application is further configured to cause the at least one computing device to at least store one of the plurality of shards in at least a subset of the at least one data store.*

*101. The system of claim 97, wherein the data storage application is further configured to cause the at least one computing device to at least:*

*identify a location of a subset of the shards in an index accessible to the data storage application;*

*retrieve the subset of the shards from the at least one data store; and*

*reconstruct the data object from the subset of the shards.*

*102. The system of claim 97, wherein the data storage application is further configured to cause the at least one computing device to at least generate an access pattern distribution of the plurality of data objects by:*

*sampling an access log of the data storage system over a specified period of time; and*

*identifying the data object accessed within the specified period of time.*

*103. The system of claim 97, wherein the data storage application is further configured to cause the at least one computing device to at least generate an access pattern distribution of the plurality of data objects by:*

*scanning an index of a plurality of data objects stored in the data storage system, the index specifying a storage location in the data storage system of the data objects and a most recent access of at least one of the data objects; and*

*identifying the data object accessed within a specified period of time.*

*104. The system of claim 97, wherein the data storage application is further configured to cause the at least one computing device to at least:*

*determine whether an access frequency of the data object meets an access frequency threshold;*

*store the data object according to the erasure coding scheme when the object size meets the size threshold and the access frequency fails to meet the access frequency threshold; and*

*store the data object according to the redundant replication scheme when the access frequency meets the access frequency threshold.*

* * * * *